United States Patent [19]

Rotter et al.

[11] 4,123,773
[45] Oct. 31, 1978

[54] SERVO ARRANGEMENT FOR THE RECORDING TAPE DRIVE IN BROADBAND SIGNAL REPRODUCING SYSTEMS

[75] Inventors: Gerhard Rotter, Mission Viejo; William A. Buchan, Newport Beach; Rainer E. an der Heiden, Anaheim, all of Calif.

[73] Assignee: BASF Aktiengesellschaft, Ludwigshafen, Fed. Rep. of Germany

[21] Appl. No.: 777,123

[22] Filed: Mar. 14, 1977

[51] Int. Cl.[2] .......................... H04N 5/79; H04N 5/785
[52] U.S. Cl. ............................................ 358/4; 358/8; 360/36; 360/73
[58] Field of Search .................. 360/36, 38, 70, 73, 360/75, 74, 33; 358/8, 4

[56] References Cited

U.S. PATENT DOCUMENTS

| 3,959,815 | 5/1976 | Rotter et al. ............................ 360/73 |
| 4,032,966 | 6/1977 | Kenney et al. ........................... 358/8 |

FOREIGN PATENT DOCUMENTS 318,981  6/1972  U.S.S.R. .................................... 360/73

OTHER PUBLICATIONS

Radio Shack, Dictionary of Electronics, 1974–1975, p. 332.

*Primary Examiner*—John C. Martin
*Attorney, Agent, or Firm*—Keil, Thompson & Shurtleff

[57] ABSTRACT

A servo arrangement for the drive motor of the recording tape of a color video recording and reproducing system, in which a phase detector is included in a tachometer loop for regulating the speed of the drive motor. Another phase detector and a voltage controlled oscillator are included in a tape lock loop for providing to the tachometer loop phase detector a reference derived from off-tape sync information. The voltage controlled oscillator is controlled by the error signal voltage of the tape lock phase detector, and the oscillator output is used as a reference for the tach loop. In one embodiment the oscillator is of the voltage controlled crystal type having a relatively high center frequency which is heterodyned down to a suitable frequency for controlling the tach loop phase detector. In this manner a servo reference of great stability is produced for the tach loop phase detector. Since the heterodyning frequency is derived from the signal carrier source present in the recorder no separate oscillator is required for generating the heterodyning frequency, and thus the costs for this highly stable servo arrangement are minimized. In all embodiments, the tape lock loop for providing the tach loop reference is independent of the feedback loop for the control of the variable delay line of the electronic time base error correction circuitry of the system, and the tape lock loop phase comparator sample pulse is disabled when a dropout is sensed so that the tach loop is substantially insensitive to signal dropouts.

13 Claims, 7 Drawing Figures

SERVO ARRANGEMENT FOR THE RECORDING TAPE DRIVE IN BROADBAND SIGNAL REPRODUCING SYSTEMS

BACKGROUND OF THE INVENTION

The invention relates generally to improvements in servo arrangements for the drive of a recording tape in broadband signal reproducing systems, such as color video recording and reproducing systems.

Our U.S. Pat. No. 3,959,815 issued May 25, 1976 for "Arrangements for Time Base Error Correction", discloses in the last embodiment thereof a magnetic tape drive servo arrangement utilizing a plurality of feedback loops, including in particular a tachometer loop and a tape lock loop. The tachometer loop includes a phase detector, the control input of which is connected to a tachometer coupled to the shaft of the capstan drive motor and the output of which is used to control the speed of the motor, by means of a frequency compensation circuit. The tape lock loop contains a phase detector which serves in playback to lock the time base pulses (for example, horizontal synchronizing pulses taken off the video tape and subject to time base error) to a stable reference frequency. The control input of the tape lock phase detector is connected to a sync separator which separates the horizontal sync pulses from the off-tape video signal. The reference input of the tape lock phase detector is connected to a stable reference which is at the horizontal video line scan frequency, and the error signal output of the tape lock phase detector is used to regulate the output frequency of a voltage controlled oscillator (VCO). The output of the VCO is connected through a divider to the reference input of the tach loop phase detector.

In the above described embodiment of U.S. Pat. No. 3,959,815 the properties and functions of the two loops complement each other. The tachometer loop is designed for a bandwidth of approximately 200 Hz and, as a result, the relatively wide band tachometer loop is able to hold the motor speed constant in the face of both relatively high and relatively low frequency variations in the speed of the motor. The tach loop, therefore, is in the nature of a coarse adjustment means. On the other hand, the tape lock loop has a bandwidth of approximately 25 Hz so as to pass only low frequency components. As a result the tape lock loop corrects for low frequency speed variations of the motor. In effect the tape lock loop stabilizes the long-time average of the horizontal synchronizing pulses by correcting changes in pulse frequency which may result from factors other than motor speed variations, such as tape stretching, tension changes and the like. The tape lock loop accordingly acts as a fine adjusting means.

The reproducing system disclosed in the above-mentioned embodiment of our U.S. Pat. No. 3,959,815 also comprises a storage-type delay line, for example a bucket brigade, by which the video signal to the TV receiver is provided with electronic time base error correction. A time base error correcting feedback loop controls the variable delay line by way of a further voltage controlled oscillator, and this feedback loop in our above patent shares at least some of the circuitry of the tape lock loop. Both the time base error and tape lock loops in our patent are taken through the delay line, both use the same sync separator, and both also utilize the same phase detector. That is, a single phase detector furnishes an error signal voltage for both the VCO of the tape lock loop and the VCO of the time base error correcting feedback loop.

While this embodiment of our U.S. Pat. No. 3,959,815 in most respects represents a highly satisfactory arrangement, we have found the foregoing partial commonality of the time base error and tape lock loops to have the disadvantage that when the tape lock loop gain is set high the tape lock loop becomes sensitive to signal dropout and the like and when the loop gain is reduced to avoid dropout problems the remaining flutter component is undesirably high.

SUMMARY OF THE INVENTION

Underlying one aspect of the present invention is the recognition that in order to prevent major fluctuations in the frequency of the off-tape time base pulses (caused by large tape speed variations or loss of signal, for example) from being introduced into the tachometer loop, it is of considerable importance that the servo reference obtained from the voltage controlled oscillator have a highly stable center frequency with a closely defined deviation.

One object of the present invention is to improve on the servo reference stability of the above described arrangement disclosed in U.S. Pat. No. 3,959,815.

It is a further object of the invention to provide an arrangement whereby the foregoing objective can be attained in an economic and reliable manner.

It is still another object of the present invention to provide a sero arrangement which is less sensitive to signal droput and remanent flutter components than that of our U.S. Pat. No. 3,959,815.

It is yet another object of the invention to render the tachometer loop more effective at times when the servo reference from the tape lock loop is not available, such as during the recording mode and preferably also during tape reversals.

According to one aspect of the present invention, a voltage controlled oscillator, preferably a voltage controlled crystal oscillator (VCXO), may be utilized in the tape lock loop to generate a relatively high center frequency. Between the output side of the VCXO and the reference input of the tach loop phase detector a mixer circuit is interposed which heterodynes the VCXO output frequency down to a relatively low frequency. In this manner a servo reference frequency of great stability can be produced for use by the tach loop phase detector.

If the D.C. error signal to the VCXO becomes too large, the VCXO will act to find its own center frequency. Thus, if momentary large fluctuations in tape speed should occur (due to such factors as tape stretch, capstan irregularities, etc), the tachometer reference frequency, without the requirement of clamping facilities or manual adjustment, will be automatically limited so that it will not track such large errors. By this means the tach loop will center on the correct operating frequency rather than lock on the maximum or minimum frequency of the operating range.

The invention further provides for impression on the mixer circuit of a stable heterodyning frequency which slightly departs from the center frequency of the VCXO so that the beat product of the VCXO and heterodyning frequencies yields a relatively low frequency which, after further frequency division, is used as a reference for the tach loop phase detector. A stable source, such as a crystal oscillator, is needed for generating this heterodyning frequency. However, according to a feature of the invention, the provision of a separate stable source can be avoided if the heterodyning frequency is derived from the same oscillator which furnishes a stable reference frequency to the tape lock loop phase detector. Assuming that, as in our U.S. Pat. No. 3,959,815, the off-tape time pulses are horizontal sync pulses, then the reference input to the tape lock loop phase detector will be of horizontal video scan line frequency. In that case the center frequency of the VCXO is preferably chosen to be a first multiple of this line frequency and the heterodyning input to the mixer circuit to be a different multiple of the line frequency. This makes it possible to derive the heterodyning frequency and the tape lock reference frequency from a single oscillator by way of frequency multiplication and/or division, and to provide at the mixer output a multiple of the horizontal line scan frequency.

It is to be noted that the crystal oscillator used to provide the heterodyning and tape lock reference frequencies may also be used to provide a color subcarrier frequency and/or other reference frequencies needed for the color video signal recording and reproducing system.

According to another aspect of the invention, difficulties arising from partial commonality of the tape lock loop and the time base error correction loop in the last embodiment disclosed in our U.S. Pat. No. 3,959,815 are avoided by divorcing these two loops from each other and, in particular, employing separate phase detectors for the respective loops.

Still further objects and advantages of the invention will become evident from the following detailed description of the preferred embodiments.

BRIEF DESCRIPTION OF THE DRAWINGS

IN THE DRAWINGS:

FIGS. 1 to 4, taken together, show the complete servo arrangement according to the invention. Particularly.

DETAILED DESCRIPTION OF THE PREFERRED EMBODIMENTS

In the color video recording and reproducing system disclosed herein the luminance component and chrominance component of the video signal are recorded on the magnetic recording tape in different frequency bands. For example, the chrominance information of the recorded signal may be accommodated in a frequency range lower than that of the luminance information. More specifically, the chroma information may be recorded as an amplitude modulated suppressed carrier signal on a carrier of 511 Khz and the luminance information recorded as frequency modulation on a carrier of about 4 Mhz. In order to correctly reproduce the chroma portion, this 511 Khz amplitude modulated chroma signal must be synchronously demodulated after retrieval from the tape. Loss of synchronization would result in improper color reproduction. In order to insure synchronous demodulation of the chroma signal the residual time base error at the input of the chroma demodulator should preferably be less than 150 nanoseconds. Inasmuch as the time base error off-tape is normally in the order of 4 to 6 microseconds, it is clear that significant time base error correction must be effected.

Electronic time base error correcting arrangements which meet the foregoing requirement have been disclosed in co-pending application Ser. No. 728,550 of Buchan et al, filed Oct. 1, 1976, now allowed and the disclosure of this co-pending application should be considered incorporated herein by way of supplement to the present disclosure. Much of FIG. 3 hereof—in which a single time base error correcting delay channel is used for both the luminance and the chrominance—is a part-showing of the two tandem connected time base error correction stages shown in FIG. 1A of co-pending application Ser. No. 728,550. Similarly, FIG. 4 hereof—in which two physically separate time base error correction delay channels are used for luminance and chrominance, respectively shows in part the two tandem connected time base error correction stages shown in FIGS. 2,3,4 of co-pending Application Ser. No. 728,550. The disclosure of co-pending application Ser. No. 728,549 of Rotter et al, filed Oct. 1, 1976, now allowed, entitled "Improved Turnaround System" is also incorporated herein, particularly in connection with further details of the recording and reference-generating circuitry of the color video recording and reproducing system in question.

Figure 2:
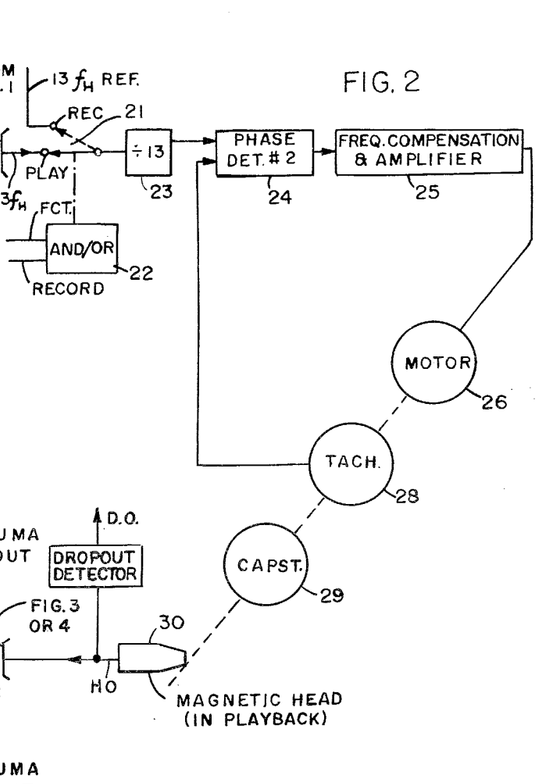
FIG. 2 is a block diagram of the tape drive including the tachometer loop and associated units.

Referring now to FIG. 2 of the present disclosure, the lower portion thereof indicates the drive for the magnetic tape including particularly a variable speed motor 26. Mounted on or otherwise coupled to the motor shaft are tachometer 28 and tape drive capstan 29. For purposes of the instant discussion the video tape recorder is assumed to be of the linear type, such as disclosed in U.S. Pat. No. 3,921,933 to Rotter et al. The servo arrangement of the present invention is equally applicable to other precision drive systems, however. In playback the signal recorded on the tape is reproduced by means of magnetic head 30 as indicated at the bottom of FIG. 2, and the output of transducer 30 appears on head output conductor HO. It will be understood that the output of transducer 30 may be impressed on conductor HO in amplified form, the amplifying means not being shown.

In the top portion of FIG. 2 there is shown a phase detector #2 designated by the numeral 24. The control input of phase detector 24 is connected to the output of tachometer 28 as shown; the reference input of the phase detector is connected to the output of a dividing stage 23 serving to divide the frequency impressed thereon from the left, FIG. 2 by thirteen; and the output of second phase detector 24 is connected to a frequency compensation and amplifier stage 25, the output of which in turn is used to vary the speed of motor 26 in a well known manner.

Figure 1:
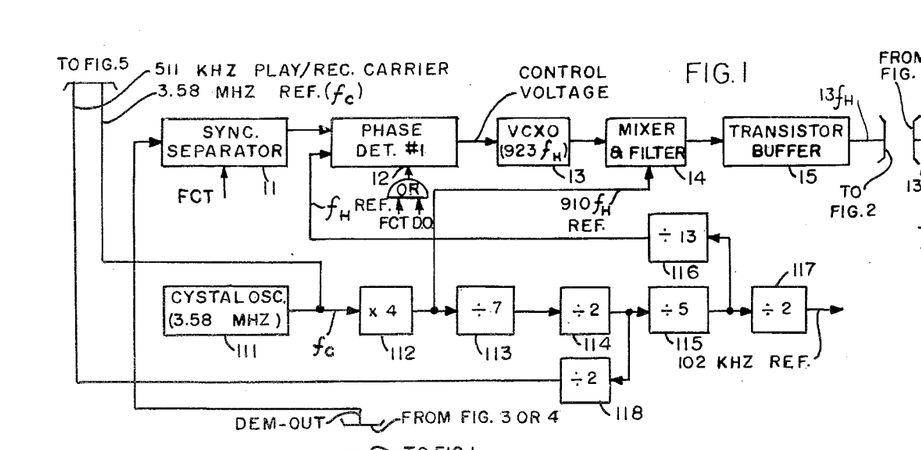
FIG. 1 is a block diagram of a portion of the tape lock loop of the invention, together with the circuitry for generating various stable frequencies, including the horizontalline reference frequency and the heterodyning frequency.
Figures 3, 4:
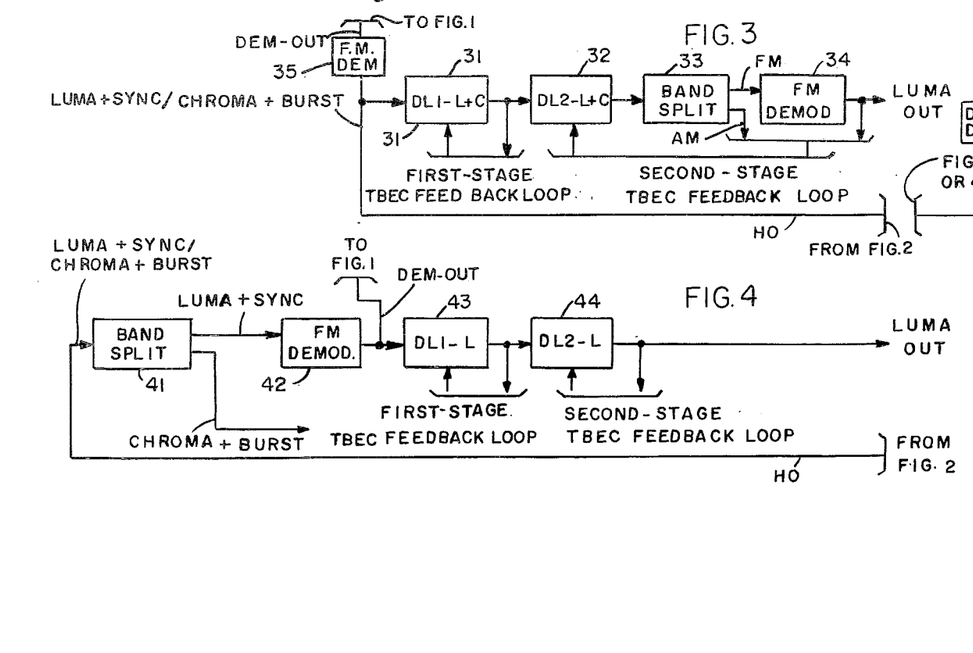
FIG. 3 is a block diagram primarily illustrating electronic time base error correcting circuitry usable in the system, wherein a single delay channel is used for both the luminance and chrominance signals.
FIG. 4 is an alternative block diagram showing electronic time base error correcting circuitry usable in the system, wherein physically separate delay channels are used for the luminance and chrominance signals, respectively.

The tape lock loop primarily shown in FIG. 1 derives a signal from head output conductor HO by way of the DEM-OUT conductor of either FIG. 3 or FIG. 4. FIG. 3 shows the case in which a single electronic time base error correction channel is provided for the luminance plus sync and chrominance plus burst signal derived from conductor HO, while FIG. 4 shows an alternative in which electronic time base error correction is provided by two physically separate time base error correction channels of which only the upper channel, for the correction of the luminance plus sync component, has been illustrated in FIG. 4.

It can be seen that when the FIG. 4 time base error corrector arrangement is used with the FIG. 1 tape lock loop and the FIG. 2 tach loop, the off-tape signal carrying the frequency modulated luminance plus sync component and the amplitude modulated chrominance plus burst component is impressed on bandsplit filter 41 in which the signal is physically split into the just-mentioned two components. As disclosed in greater detail in co-pending application Ser. No. 728,550 of Buchan et al, two tandem connected correction stages are used in the chrominance as well as the luminance channel, the first stage in each case serving for the coarse correction of the respective signal and the second stage serving for the fine correction of the respective signal. In the case of the luminance channel shown in FIG. 4 of the present disclosure, the correcting element of the first stage is in the form of a storage-type delay line DL1-L (designated 43) and the correcting element of the second stage is in the form of storage-type delay line DL2-L (designated 44). The variable delay lines may be charge coupled devices, for example.

As shown in FIG. 4 the luminance plus sync signal in demodulated form is impressed on delay line 42 by FM demodulator 42. The output of FM demodulator 42 is also connected to the tape lock via the DEM-OUT conductor to the input of sync separator 11, FIG. 1.

FIG. 4 indicates in a general way how the two delay lines are varied by means of a first stage time base error correction feedback loop and a second stage time base error correction feedback loop, respectively. Since details of these loops do not form a part of the present invention, no further description thereof is given here. Particular arrangements of the time base error correction loops may be found, however, in co-pending application Ser. No. 728,550. This co-pending application also shows the particulars of the time base error correction of the chrominance plus burst channel which contains an amplitude demodulating means in the form of a synchronous double-balanced demodulator. It will be understood, therefore, that the chrominance channel serves to provide an amplitude demodulated and time base error corrected chrominance signal on a chroma-out conductor (not shown in FIG. 4). The time base error correction channel preferably reduces the time base error to the input of the chroma demodulator to less than 100 nanoseconds, thereby assuring proper synchronous demodulation of the chroma signal. The luminance time base error channel illustrated in FIG. 4 furnishes an FM demodulated and time base error corrected luminance signal on the luma-out conductor of FIG. 4. The chroma and luma signals, after further processing, are combined in a manner known in the art to produce a video output signal of conventional format.

For the case where the time base error corrector of FIG. 3 is connected as indicated with the tape lock loop of FIG. 1 and the tach loop of FIG. 2, the modulated luma plus sync and modulated chroma plus burst signals incoming from the HO conductor are impressed on a first stage delay line DL1-L+C and, in series connection therewith, a second stage delay line DL2-L+C. These two delay lines, preferably in the form of charge coupled devices, are designated 31 and 32, respectively. The output of second stage delay line 32 is impressed on bandsplit filter 33 and the signal is split into the frequency modulated luminance signal and the amplitude modulated chrominance signal, as shown. Frequency demodulator 34 supplies the demodulated luminance signal to the luma-out conductor and, along with the AM signal, to TBEC feedback loop #2. Reference is made to co-pending application Ser. 728,550 for details of the first and second stage time base error feedback loops.

In the case of FIG. 3 a separate frequency demodulator 35 is provided for the tape lock loop. The input of demodulator 35 is connected to the HO conductor carrying the entire LUMA + SYNC/CHROMA + BURST off-tape signal, and the output of demodulator 35 is connected via the DEM-OUT conductor to sync separator 11 of FIG. 1.

It may be added to the foregoing description that the various TBEC feedback loops are of a relatively large bandwidth and that they act to correct high frequency variations resulting from motor speed related disturbances such as high frequency variations in tape tension. For simplicity the filters serving to limit the bandwidths of the TBEC feedback loops, and the other loops involved in the arrangement according to the present embodiment, are not shown in the drawings. It may be mentioned, however, that in an experimental example which has given highly satisfactory results the tachometer loop has a bandwidth of 500 to 800 Hz, the tape lock loop has a bandwidth of 60 to 100 Hz and the first and second stage time base error correcting feedback loops have bandwidths of 800 Hz and 2 KHz. respectively.

As indicated above, it will be noted that the DEM-OUT conductor from either FIG. 3 or FIG. 4 is connected to the input of sync separator 11 of FIG. 1. Sync separator 11 serves to separate the horizontal sync pulses from the demodulated luminance + sync signal of FIG. 3 or from the entire demodulated off-tape signal of FIG. 4. Phase detector 12 has a second input conductor for receiving a control signal from an OR gate. The OR gate receives at one input a control signal, FCT which enables operation of phase detector 12 when the tape is operating at constant speed and which disables phase detector 12 when the tape is accelerating, decelerating or stopped. In this fashion the tachometer loop of FIG. 2 is prevented from locking to sync signals off-tape during the time when the tape is accelerating or decelerating or stopped. The FCT signal may be derived, for example, from a device (not shown) which monitors the output of tachometer 28 and provides an enabling signal to phase detector 12 when the tachometer output is within a predetermined frequency range indicative of constant tape operating speed. Since details of the FCT signal producing apparatus do not constitute a part of the present invention and means for implementing the FCT signal function are known in the art, no further explanation thereof is given here. The OR gate receives at a second input a control signal D.O. from a conventional dropout detector (such as shown in U.S. Pat. No. 3,947,873) coupled to transducer 30, FIG. 2. Control signal D.O. serves to disable phase detector 12 when a signal dropout occurs so that the tape lock loop will not track noise occurring during the dropout interval.

The separated off-tape sync signal is supplied to the control input of phase detector 12 and the remaining input to phase detector 12 has a reference of horizontal line frequency $f_H$ impressed thereon. The $f_H$ reference may be derived from a crystal oscillator 111 in a manner explained in greater detail below. The output of phase detector 12 furnishes a DC control voltage to a voltage controlled crystal oscillator 13 having a center frequency of, in the present example, 923 times the line frequency $f_H$. The output of the VCXO is connected to one input of mixer stage 14 which has another input on which a reference frequency of 910 times line frequency $f_H$ is impressed in a manner to be explained below. Mixer stage 14 selectively provides the beat product between the two input frequencies of the mixer, at a frequency of $$923 f_H - 910 f_H = 13 f_H.$$

The 13 $f_H$ beat frequency is impressed on transistor buffer 15 which is used to clean up the wave form, and the signal is then passed through divider-by-13 23, FIG. 2, when switch 21 is in "play" position. The output of divider 23 supplies a signal at line frequency $f_H$ to the reference input of phase detector 24 of the tachometer loop.

Figure 5:
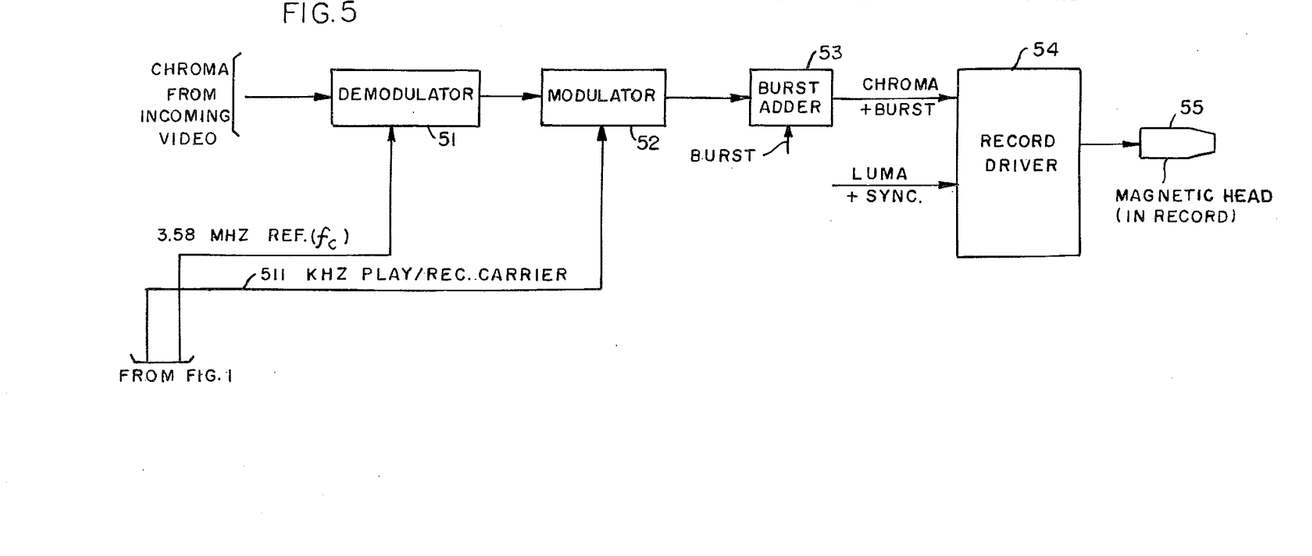
FIG. 5 is a block diagram of the recording portion of the color video recording and reproducing system, especially as it relates to the demodulation and remodulation of the chrominance content of the incoming video signal.

In the lower portion of FIG. 1, the multiplying and dividing stages are shown which serve to derive both the $f_H$ reference for phase detector 12 and the heterodyning frequency of 910 $f_H$ for mixer tuner stage 14. As can be seen from FIG. 1, the 910 $f_H$ heterodyning frequency may be derived from a 3.58 Mhz crystal oscillator 111 by multiplying by 4 at multiplier 112. Also derived from the output of multiplier 112 through dividing stages 113, 114, 115 and 116, is the $f_H$ reference frequency for phase detector 12. It may be further noted that by means of divider-by-2 117 there is derived from the output of divider-by-5 115 a 102 Khz reference which, as disclosed in the above referenced co-pending application, Ser. No. 728,549, serves as a sound carrier frequency in the overall video signal recording and playback system. Moreover, as shown in FIG. 1, there is also derived from divider-by-2 114, through divider-by-2 118, a 511 Khz chroma recording carrier reference frequency which, as shown in FIG. 5, is supplied to amplitude modulator 52 forming part of the chrominance signal recording channel. The Chroma subcarrier frequency of 3.58 Mhz generated by crystal oscillator 111 is directly impressed on an input of demodulator 51 in the recording channel, which, in the recording mode, serves to demodulate the chrominance of the incoming conventional video signal to baseband prior to its AM modulation in modulator 52 for recording purposes. FIG. 5 also indicates addition of the chroma burst to the AM chroma signal at burst adder 53. The resulting chroma plus burst signal is impressed on record driver 54 which also has a luminance plus sync signal provided thereto. The output of record driver 54 is provided to recording head 55 which may or may not be the same as playback head 30 shown in FIG. 2.

From the foregoing it can be seen that skillful use is made in the present embodiment of a single crystal oscillator to provide a multiplicity of different reference frequencies, including the reference frequency for phase detector 12 and the heterodyning frequency for mixer and filter stage 14. Although the crystal oscillator 111 shown in FIG. 1 is tuned at the NTSC color subcarrier frequency, 3.58 Mhz, the desired reference frequencies may be derived directly from a 14.32 Mhz oscillator rather than from multiplying the 3.58 Mhz frequency of crystal oscillator 111 by 4 as shown. In either case only one oscillator is required to generate the stable reference frequencies for use by phase detector 12 and mixer 14, thereby minimizing the cost of the reference source equipment necessitated by the present invention.

As noted above, voltage controlled crystal oscillator 13 is designed to center on a frequency of 923 $f_H$. Minor variations of this frequency are effected in response to the DC control voltage received from phase comparator 12, however, so long as the DC control voltage is within a limited range of values. When the DC control voltage, such as in the case of large errors in tape speed, goes outside this range, the oscillator will tend to center on its 923 $f_H$ crystal frequency.

The following computation will show that with the FIG. 1 arrangement it is possible to provide at the output of mixer 14, a center frequency of great stability. Assume, for example, that the deviation of the mixer output frequency from its nominal value is to be at the most $\pm$ 2%. Assuming further that the deviation of the VCXO from its center frequency is $\pm$ 0.025%—which for crystal oscillators is a conservative assumption—then the output voltage $f_X$ of the VCXO is $f_X = 923 f_H (1 \pm 0.00025) = 923 f_H \pm 0.00025 \times 923 f_H$. In mixer stage 14 the fixed reference frequency (heterodyning frequency) of 910 $f_H$ is subtracted from $f_X$ so that the output frequency of the mixer $f_M$ is $$f_M = f_X - 910 f_H = 13 f_H \pm .00025 \times 923 f_H =$$
$$13 f_H \pm .23075 f_H$$
$$= 13 f_H (1 \pm \frac{.23075}{13}) = 13 f_H (1 \pm .017).$$

This last equation shows that the deviation of the frequency output of the mixer is $\pm$ 1.7%, within the desired limit of $\pm$ 2%.

In playback the input to divider-by-13 23, FIG. 2, is taken through switch 21 from transistor buffer 15. Switch 21, which may be in the form of a logic gate, can be transferred between its playback and record positions by AND/OR gate combination 22. The Rec. contact of switch 21 is connected to a 13 $f_H$ reference which, for example, may be obtained directly from the output of divider-by-5 115 of FIG. 1. With switch 21 in its record position, the tape lock loop will have impressed thereon a stable $f_H$ reference derived from crystal oscillator 111, while with switch 21 in playback position the $f_H$ frequency is provided by the tape lock loop of FIG. 1, which represents the average horizontal sync pulse frequency of the off-tape sync signal. It will thus be appreciated that under the control of the Record signal (derived, for example, from a manually operable switch, not shown) and the FCT signal provided at the input side of AND/OR gate combination 22 a crystal controlled reference of 204 KHz is substituted for the 13 $f_H$ = 204 KHz output of the tape lock loop. When neither the record signal is true nor the FCT signal false, logic combination 22 will leave switch 21 in the playback position shown. But if either the record signal is true or the FCT signal false, then gate 22 will transfer switch 21 to the Rec. position. The crystal controlled 13 $f_H$ reference is thus employed in the tach loop so that the tape drive speed is maintained constant during recording, and so that the tape drive acceleration and deceleration is stabilized during reversal of the tape travel direction. The full count signal, FCT, is false during the tape travel reversal as explained in the above referenced co-pending application, Ser. No. 728,549. Thus, the tachometer loop will function to stabilize the tape drive under all conditions of operation.

Referring once again to FIG. 1, the tape lock loop shown therein includes a voltage controlled oscillator 13 having a center frequency at 923 $f_H$, followed by a mixer 14 for heterodyning the 923 $f_H$ signal with a crystal derived reference at 910 $f_H$ to generate a 13 $f_H$ output. It is to be noted that voltage controlled oscillator 13 need not be a crystal reference device, but may instead be a conventional voltage controlled oscillator (VCO). However, the use of a VCXO rather than a VCO eliminates the need for initial manual tuning of the oscillator at the center frequency and, in conjunction with the selection of a correspondingly high center frequency and the addition of heterodyning mixer 14, results in a more stable control frequency to phase detector 24.

Figure 6:
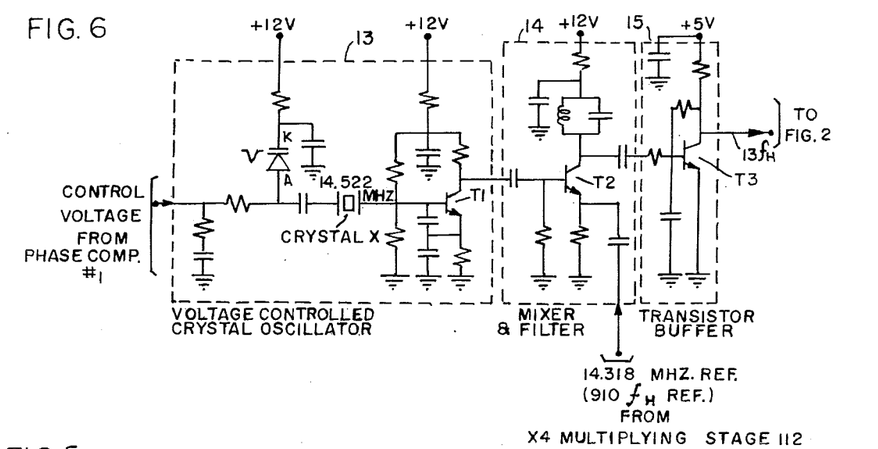
FIG. 6 is a detailed circuit diagram of the voltage controlled crystal oscillator, mixer and buffer of FIG. 1.

Because the inventors have found the use of a VCXO 13, mixer 14 and transistor buffer 15 to be an advantageous way of implementing the tape lock loop, a typical circuit arrangement for these components is given in FIG. 6. The VCXO circuit 13 comprises a crystal X and transistor T1 with appropriate biasing components. Crystal X is tuned, for example, so that the VCXO center frequency is 14.522 Mhz, which is 923 $f_H$ for NTSC line scan frequency. Between the VCXO control voltage input and crystal X is a Varactor which changes capacitance with the applied control voltage. Since the crystal X behaves much like a large inductance coupled to a relatively small capacitance, the effect of changing the capacitance of Varactor V is to modify the resonant frequency of the oscillator, as is known in the art. Mixer circuit 14 receives the VCXO output (nominally at 923 $f_H$) and the 910 $f_H$ heterodyning reference at respective inputs and supplies at an output a difference frequency, 13 $f_H$. Transistor T2 of mixer 14 is driven into the non-linear range so that numerous modulation components are produced, but the tuned L-C circuit in the collector lead of T2 assures that only the 13 $f_H$ component is provided to transistor buffer 15. The transistor buffer serves to shape the 13 $f_H$ signal applied to the tach loop of FIG. 2. Since circuits such as VCXO 13, mixer 14 and buffer 15 individually are well known in the art, further detailed description thereof is unnecessary.

Referring again to FIGS. 1 to 4 of the drawings, it will be noted that contrary to the last embodiment of Rotter et al U.S. Pat. No. 3,959,815 two separate loops, each having a respective phase comparator, are provided for respectively generating a servo reference and for controlling the variable delay line of the electronic time base error corrector. As will be seen from FIGS. 3 and 4, the variable delay lines of the electronic time base error corrector are also provided outside of the tape lock loop furnishing the servo reference so that the tape lock loop is connected in the off-tape signal circuit at a point preceding, rather than following, the variable delay lines.

This aspect of the invention and its advantages will now be explained with reference to FIG. 7. In order to more clearly establish the corresponding improvements over the last embodiment of our U.S. Pat. No. 3,959,815, the VCXO 13 and mixer 14 of FIG. 1 are replaced with simply a VCO 715 in FIG. 7. It will be understood, however, that VCO 715 could be replaced with a VCXO and mixer. As in the case of FIGS. 1 to 4 hereof, the color video signal recorded on the tape contains chroma and luma information components as well as horizontal sync pulses, but the particular characteristics of the recorded signal have been left open in the simplified showing of FIG. 7. If the signal should be one that has been modulated on a carrier prior to recording, then the corresponding demodulating means would be included in block 721 labeled Signal Electronics. Switching means 21 of FIG. 2 hereof has been represented in FIG. 7 simply as a mode switch 725 without a particular showing of how this switch is operated. Switch 725 serves to make the benefits of the tachometer loop available also during the record mode—and, if desired, also during reversal of tape travel direction as in FIG. 2.

Figure 7:
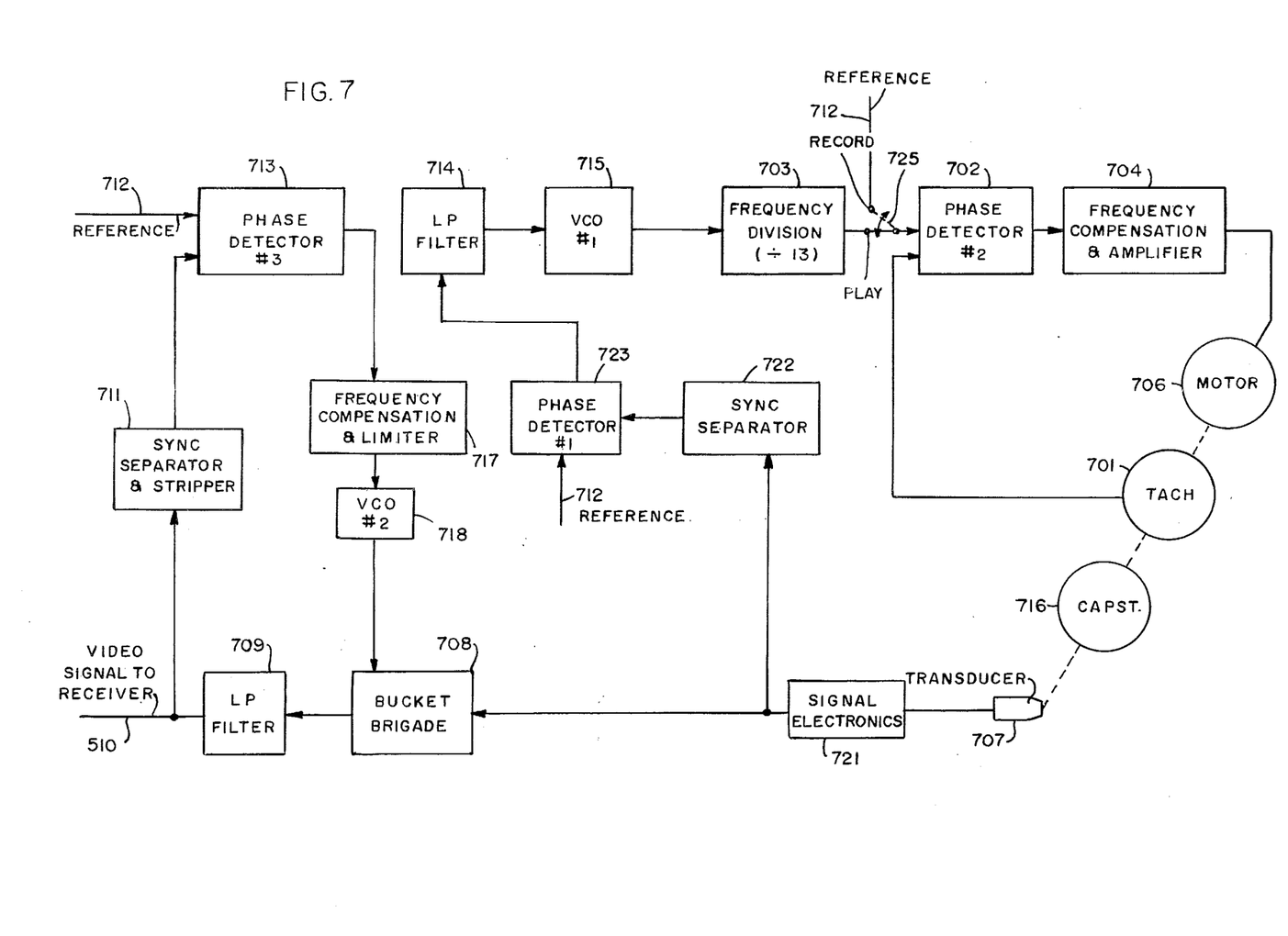
FIG. 7 is a block diagram primarily illustrating the separation of the tape lock loop and the time base error correcting feedback loop of the system.

As will be seen from FIG. 7 the reproducing system shown therein comprises
1. a tachometer loop extending from tachometer 701, second phase detector 702, frequency compensation and amplifier 704 to motor 706 which drives tape capstan 716;
2. a tape lock loop which extends from transducer 707 via signal electronics 721, sync separator 722, first phase detector 723, low-pass filter 714, VCO #1, designated 715, frequency division 703, mode switch 725 in playback position to the reference input of second phase detector 702, thereby providing a servo reference for this detector and hence acting to exert, through phase detector 702 and frequency compensation 704, a correcting effect on the speed of tape drive motor 706.; and
3. an electronic time base error correcting loop which extends from conductor 510 carrying the corrected video signal, by way of sync separator and stripper 711, third phase detector 713, frequency compensation and limiter 717, VCO #2 designated 718, to variable delay line means, here shown in the form of a bucket brigade 708.

Bucket brigade 708 is interposed in the connection from the output of signal electronics 721 to conductor 510, with low-pass filter 709 acting to eliminate high frequency switching transients resulting from the operation of bucket brigade 508. Conductor 712 connected to the reference input of phase detectors 713 and 723 as well as to the Record contact of mode switch 725, supplies a stable reference source from a crystal oscillator operating at the horizontal video scan line frequency, for example.

Generally speaking the three loops listed above have respective functions comparable to those described for the three loops of FIG. 5 of our U.S. Pat. No. 3,959,815. More particularly, the tachometer loop is a relatively wide band loop and is able to pass comparatively high frequency variations in motor speed; the tape lock loop is designed to pass only low frequency components and hence it corrects for low frequency changes in the speed of the drive motor; and the time base error loop has a greater bandwidth than the tachometer loop and serves to reduce the remaining time base error.

From the foregoing it will be understood that in FIG. 7 hereof as well as FIG. 5 of U.S. Pat. No. 3,959,815, notwithstanding the fact that the output of VCO#1 is connected via the frequency divider, to the "reference" input of phase detector #2, the circuit in question is a true feedback "loop" and hence is appropriately called herein a "tape-lock loop". For it does in fact act, through the frequency compensation, to correct the speed of the tape drive motor, namely for relatively low frequency components thereof—whereas, all the while relatively high frequency changes in motor speed are corrected by the tachometer loop passing through the other input of this phase detector. In effect then, phase detector #2, as well as the output thereof, is common to both the tachometer loop and the tape-lock loop.

However, the circuit shown in FIG. 7 hereof significantly differs from that shown in FIG. 5 of our U.S. Pat. No. 3,959,815 in that the tape lock loop is divorced from the time base error correcting feedback loop. More specifically, in FIG. 7 each of these two loops has its own phase detector, 723 and 713, respectively, and its own sync separator, 722 and 711. While the time base error correcting feedback loop derives the off-tape signal through filter 709 from the output of the delay line means 708, the tape lock loop derives the off-tape signal from the output of signal electronics 721 directly, that is, from a point of the off-tape signal circuit preceding the delay line means. In contrast, in the circuit shown in FIG. 5 of our U.S. Pat. No. 3,959,815, the error signal for the VCO of the tape lock loop is taken—through the low-pass filter in the input circuit of this VCO—from the output of the phase detector of the time base error correcting feedback loop so that in the U.S. Pat. No. 3,959,815 the phase detector, sync separator and delay line means and associated filter are common to both these loops. We have determined that in the earlier circuit the tape lock loop is sensitive to signal dropouts if the loop gain is at a high setting and that, if the gain is reduced to avoid such dropout problems, the flutter of the system tends to become rather high. With the tape lock and time base error correction loops separated as in the present invention, these difficulties are avoided. That is, the tape lock loop, with the aid of low-pass filter 714, can be made insensitive to tape dropouts, interferences and the like, while the tachometer loop still eliminates all transport related disturbances which would give rise to flutter.

It will be understood that the embodiments described herein are offered merely as examples and that they are not intended to limit the scope of the invention defined by the following claims.

We claim:
1. A servo arrangement for regulating the speed of means for driving a recording tape relative to a signal transducer in a broadband signal reproducing system, the broadband signal recorded on said tape including a synchronizing information signal; said arrangement including:
a tachometer servo loop comprising said drive means, means for producing a tachometer signal representing the speed of said drive means, means for detecting the phase difference between said tachometer signal and a tape lock reference signal and for providing a loop control signal representing the detected phase difference, and means for regulating the speed of said drive means in response to said control signal; and
a tape lock loop comprising said signal transducer, means for separating said synchronizing information signal from the signal transducer output, means for detecting the phase difference between said synchronizing information signal and a fixed reference signal and for providing an oscillator control signal, and controllable means dependent on said oscillator control signal for providing a frequency representing the tape lock reference signal to said first mentioned phase detecting means whereby said first mentioned phase detecting means is common to said tachometer loop and said tape-lock loop;
said controllable means including a voltage controlled oscillator having a center frequency, and also including means connected between said voltage controlled oscillator and said first-mentioned phase detecting means for heterodyning the voltage controlled oscillator output signal to a relatively lower frequency, whereby a highly stable tape lock reference signal is generated.

2. The servo arrangement of claim 1, wherein said oscillator is a voltage controlled crystal oscillator.

3. The servo arrangement of claim 2, wherein said heterodyning means comprises a mixer provided at a first input with the relatively high frequency voltage controlled crystal oscillator output signal and at a second input with a heterodyning signal comprising a reference signal of a second relatively high, fixed frequency departing from the voltage controlled crystal oscillator output frequency.

4. The servo arrangement of claim 3, wherein said heterodyning means reference signal and said tape lock loop detecting means reference signals are derived from a common source.

5. The servo arrangement of claim 3, wherein the broadband signal is a video signal and the synchronizing signal comprises time base pulses at the horizontal line scan frequency.

6. The servo arrangement of claim 5, wherein the center frequency of said voltage controlled crystal oscillator is a first multiple of the horizontal line scan frequency and the heterodyning signal is a second multiple of the horizontal line scan frequency.

7. The servo arrangement of claim 1, wherein the broadband signal is a modulated video signal and said tape lock loop further comprises means interposed between said transducer and said separating means for demodulating said video signal.

8. The servo arrangement of claim 7, wherein said video signal includes frequency modulated luminance and synchronizing information in a first frequency band and amplitude modulated chrominance and chroma burst information in a second frequency band, and wherein there are provided physically separate and commonly controlled delay channels for providing electronic time base error correction for said luminance and synchronizing information and for said chrominance and chroma burst information, respectively.

9. The servo arrangement of claim 8, wherein said demodulating means comprises a frequency demodulator in the time base error correction channel for said luminance and synchronizing information.

10. The servo arrangement of claim 1, wherein there are provided means in addition to and separate from said tape lock loop for correcting time base error in the reproduced broadband signal, comprising variable delay means coupled to said transducer for subjecting the reproduced broadband signal to a variable delay, and at least one time base error feedback loop coupled to said variable delay means for controlling the delay to which the broadband signal is subjected.

11. The servo arrangement of claim 1, wherein there is further provided a fixed frequency tachometer loop reference source and wherein said tape lock loop further comprises means interposed between said controllable means and the reference input of said first-mentioned phase detecting means for selectively switching said reference input from the output of said controllable means to the output of said fixed frequency tachometer loop reference source, whereby said tachometer loop is effective to regulate the speed of said drive means when a usable tape lock reference signal is not available from said tape lock loop.

12. A servo arrangement for regulating the speed of the drive means of a recording tape in a broadband signal reproducing system having transducer means, and an off-tape signal path connected to said transducer means and including variable storage-type delay line means, there being connected to said delay line means, for the control thereof, a feedback loop with phase comparator means therein, said feedback loop being designed to correct for relatively high frequency time base error of the off-tape signal; said servo arrangement comprising:

a first and a second phase detector, a first servo loop in the form of a tachometer loop, including said second phase detector, for regulating the speed of said drive means, and a second servo loop in the form of a tape lock loop, also including said second phase detector and connected to provide a reference for said second phase detector, said tape lock loop further including said first phase detector and a voltage controlled oscillator connected to, and controlled by the error signal voltage developed by, said first phase detector, and being designed to correct for variations in off-tape signal frequencies relatively lower than those of said high frequency time base error, and said tape lock loop, with said first phase detector therein, having means for disabling during dropout, and being connected to said off-tape signal path at a point preceding said delay line means with its time base error correcting feedback loop, so that said tape lock loop is rendered relatively insensitive to dropout without diminishing the effectiveness of said loop in correcting for said variations in relatively lower off-tape signal frequencies.

13. A servo arrangement for regulating the speed of the drive means of a recording tape in a broadband signal recording and reproducing system, said servo arrangement comprising:

a first and a second phase detector, a first loop in the form of a tachometer loop, including said second phase detector, for regulating the speed of said drive means, and a second loop in the form of a tape lock loop, also including said second phase detector and connected to provide a reference for said second phase detector, said tape lock loop further including said first phase detector and a voltage controlled oscillator connected to, and controlled by the error signal voltage developed by, said first phase detector, and also including a switching means connected to the reference input of said second phase detector; and logic means responsive to a mode signal received when said system is in the recording mode and also to a speed-indicative signal received during tape reversals, for switching said reference input from said voltage controlled oscillator to a stable reference source so as to keep said tachometer loop effective to stabilize the tape drive even while a usable reference for said second phase detector is not available from said tape lock loop.

* * * * *